United States Patent Office 3,743,602
Patented July 3, 1973

3,743,602
OPTICAL BRIGHTENING AGENTS IN
DETERGENT COMPOSITIONS
Masaaki Ohkawa, Takatsuki, Masatoshi Matsuo, Ibaragi, Tadao Sakaguchi, Osaka, Syozi Sato, Hirakata, and Yoshikazu Momoi, Osaka, Japan, assignors to Sumitomo Chemical Company, Ltd., Osaka, Japan
No Drawing. Original application Jan. 27, 1969, Ser. No. 794,388, now Patent No. 3,630,944. Divided and this application Apr. 20, 1971, Ser. No. 135,741
Claims priority, application Japan, Mar. 14, 1968, 43/16,916; Apr. 9, 1968, 43/23,610
Int. Cl. C09k 1/00; C11d 3/42; D06l 3/12
U.S. Cl. 252—110         2 Claims

ABSTRACT OF THE DISCLOSURE

β-Form crystals of a compound represented by the formula

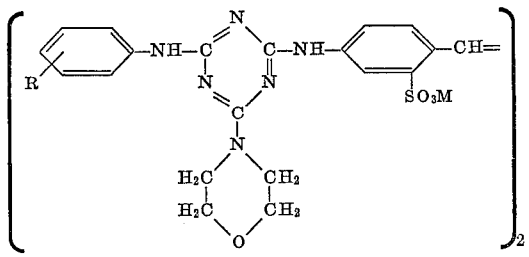

wherein R is hydrogen atom or methyl group; and M is sodium or potassium having a particle size of about 1 x 2μ which is prepared by pulverizing said crystals in the presence of alkaline phosphates and/or alkaline silicates or in the presence of alcohol, ester, ketone, hydrocarbon or a mixture thereof are employed as an optical brightening agent in a washing agent also containing a detergent and a builder.

---

This application is a division of my copending application, Ser. No. 794,388, filed Jan. 27, 1969 now U.S. Pat. No. 3,630,944.

This invention relates to pulverized optical brightening agent and to a process for preparing the same. More particularly, the invention pertains to pulverized β-form crystals of the compound having the formula shown below and to a process for the production thereof,

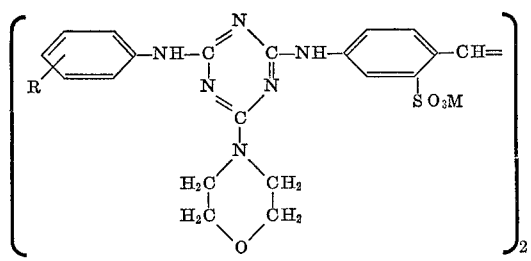

wherein R is hydrogen atom or methyl group; and M is sodium or potassium.

The compounds represented by the above-mentioned formula have been known as optical brightening agents for blending with detergents. Ordinarily, they are classified into two kinds of compounds different in crystal form; compounds in the form of yellow α-form crystals (hereinafter referred to as "α-form") and compounds in the form of white β-form crystals (hereinafter referred to as "β-form"). Compounds obtained according to ordinary synthesis reactions are of the yellow α-form. When subjected to X-ray analysis, α-form compounds of the aforesaid formula, wherein R is hydrogen atom, for example, show sharp diffraction peaks at 2θ of 5.0°, 9.0°, 15.0°–21.0° and 26.0°. On the other hand, compounds of the β-form are obtained by subjecting said α-form compounds to an (α→β transition) treatment, e.g. the treatment disclosed in Belgian Pat. 680,847. They are white in appearance and are columnar crystals large in grain size ranging from about 3 x 20μ to 1 mm. x 8 mm. In the case of β-form compounds of the aforesaid formula, wherein R is hydrogen atom, for example, there are observed, according to X-ray analysis, markedly sharp diffraction peaks at 2θ of 3.2°, 8.8°, 9.5°, 10.4°, 16.4°, 18.4°, 20.2°, 21.4° and 25.3°.

Compounds which are actually employed, are those of said β-form. They are useful as optical brightening agents for cellulosic materials and particularly display such markedly excellent efficiencies as shown below when used as optical brightening agent for detergents.

(1) They are excellent in optical brightening efficiency on fabrics.
(2) They are prominent in chlorine bleach fastness and light fastness.
(3) They are excellent in optical brightening efficiency on appearance of detergents.

Despite such excellent efficiencies as mentioned above, however, the β-form compounds are extremely unstable.

Accordingly, when stood in the presence of water, for example, they are immediately brought back to the original α-form (β→α transition). The compounds, after having been converted to the α-form in the presence of water, do not become the white β-form unless they are subjected to an α→β transition treatment such as mentioned in Belgian patent specification No. 680,847, Example 1. Moreover, in using said β-form compounds in admixture with a detergent, the said compounds are ordinarily supplied in the form of an aqueous dispersion, suspension or solution, and are frequently allowed to stand as a stock solution for a relatively long period of time. In such a case, the stock solution is naturally colored to yellow.

For the prevention of such coloration, there has conventionally been adopted a procedure to use the stock solution immediately after preparation. Such a procedure is, however, very hard to operate and usually a yellow-coloration cannot be avoided.

Further, in using the above-mentioned β-form compounds in admixture with a detergent, it is necessary that said compounds be pulverized as fine as possible in order that said compounds effectively deposit on a fabric or the like to impart optical brightness thereto. This form of the dye is difficultly water-soluble, and therefore it is desired that particles of the dye be made fine to improve the water-solubility thereof and to increase the brightening effect thereof, particularly at low temperatures, on a fabric or the like.

For pulverization of such β-form compounds, there may be adopted a mechanical procedure using a ball mill or the "Jet Mizer" manufactured by Fluid Energy Processing & Equipment Co. However, according to the ball mill procedures, the pulverizing operation is inefficient, while according to the latter procedure, there is a limit in degree of pulverization (particles having a granularity of about 3 x 10μ are ordinarily obtained). Further, there may be adopted a process in which the β-form compounds are pulverized in an aqueous medium in such a manner, for example, that an aqueous suspension of the compounds is mixed under vigorous agitation with glass beads to pulverize the compounds (hereinafter referred to as "the glass beads pulverization process") or the suspension is subjected to a ball mill process. According to the above-mentioned process, it is possible to easily obtain dye particles having a size of about 1 x 2μ. However, when subjected to said processes of pulverization in water, the white β-form compounds are changed in color to yellow to green in several minutes after initiation of the operation and are converted to the aforesaid α-form. This indicates the fact that in an aqueous medium, the β→α transition of crystals takes place quite easily. Moreover, such transition cannot be inhibited by addition of a common inorganic salt or surface active agent. When the crystals, which have been greatly colored to yellow to green, are blended with a detergent, the color of the detergent is markedly yellowed and the commodity value thereof is greatly reduced.

An object of the present invention is to provide pulverized optical brightening agent of β-form compounds represented by the aforesaid formula, which compounds are prevented from β→α transition and do not cause yellowing.

Another object is to provide washing agents containing pulverized β-form compounds of the aforesaid formula.

A further object is to provide optical brightening agents excellent in brightening efficiency at low temperatures.

A still further object is to provide a process for preparing such stable β-form compounds as mentioned above which are prevented from β→α transition and are fine.

The present invention will be explained in detail below.

(A) Crystal pulverization process

The crystal pulverization process is carried out in the following manners:

The β-form compounds represented by the aforesaid formula are mixed with alkaline phosphates and/or alkaline silicates and water, the amount of the compound being 0.1–0.5 time the weight based on the total weight of the phosphates and/or silicates and water, and the amount of the phosphates and/or silicates being 0.05–0.5 time the weight based on water. The mixture is subjected to glass beads pulverization process, or to ball mill or sand mill process and is treated until the particle size of said compound becomes about 1 x 2μ under microscopic observation. During the treatment, the mixture is desirably heated to between 20° C. and 100° C. If necessary, the mixture may be incorporated with third materials, e.g. an α→β transition promotor such as i-butanol, methyl Cellosolve or methyl carbitol; a nonionic surface active agent; and a neutral or basic inorganic salt such as Glauber's salt, sodium chloride, sodium hydroxide or sodium carbonate.

The resulting liquid may be directly added to a detergent. If necessary, however, the liquid can be formed into a powder through such drying step as spray drying, ordinary heat drying or the like.

The alkaline phosphates employed in the present invention include sodium orthophosphate, potassium orthophosphate, sodium pyrophosphate, potassium pyrophosphate, sodium tripolyphosphate and potassium tripolyphosphate; alkaline phosphates which, when formed into aqueous solutions, come to show a pH of at least 8; and aqueous solutions of orthophosphoric acid, metaphosphoric acid, pyrophosphoric acid, tripolyphosphoric acid, sodium primary phosphate, potassium primary phosphate, sodium secondary phosphate, potassium secondary phosphate, sodium metaphosphate and potassium metaphosphate which have been made alkaline by addition of an alkaline substance, e.g. caustic alkali or alkali carbonate.

The alkaline silicates employed in the present invention include sodium silicate, potassium silicate, sodium tetrasilicate, potassium tetrasilicate, sodium metasilicate and potassium metasilicate; and aqueous solutions of silicon monoxide, silicic acid, tetrasilicic acid and metasilicic acid which have been made alkaline by addition of alkaline substances, e.g. caustic alkali and alkali carbonate.

An organic solvent may be used in place of alkaline phosphates and/or alkaline silicates in the aforesaid pulverization process, whereby β-form crystals of the compounds represented by the aforesaid formula can be finely pulverized without yellowing (without causing β→α transition). For this purpose, the use of alcohols, esters, ketones, hydrocarbons and mixed solvents thereof, which do not substantially dissolve the above compounds, is extremely effective.

The alcohols employed in the present invention include aliphatic alcohols such as methanol, ethanol, n-propanol, i-butanol and cyclohexanol; the esters include aliphatic esters such as methyl acetate, ethyl acetate and methyl propionate, and aromatic esters such as ethyl benzoate and the like; the ketones include aliphatic ketones such as acetone, methylethylketone and methyl-i-butylketone, and aromatic ketones such as acetophenone and benzophenone; and the hydrocarbon includes liquid aliphatic hydrocarbons such as pentane, n-hexane and cyclohexane, halogenated aliphatic hydrocarbons such as chloroform, carbon tetrachloride, dichloroethane, trichloroethane, dichloroethylene and trichloroethylene, aromatic hydrocarbons such as benzene, toluene and xylene, and halogenated aromatic hydrocarbons such as monochlorobenzene and dichlorobenzene.

These organic solvents may be used in the form of mixtures of 2 or more.

β-Form crystals of the compounds of the aforesaid formula are suspended in an amount of 0.1–0.5 time based on the weight of the said solvent and are pulverized according to glass beads pulverization process or to ball mill or sand mill process until the crystals come to have a particle size of about 1 x 2μ under microscopic observation. The resulting liquid can be directly incorporated into a detergent. If necessary, however, the liquid may be formed into a white pulverized powder either by removing the organic solvent by distillation under reduced pressure or at atmospheric pressure, or by separating the solids from the organic solvent by filtration or centrifuge.

(B) Washing agents containing the pulverized β-form compounds

A solution or suspension of a soap or a synthetic detergent is homogeneously mixed with the liquid or powder obtained by the above process (A), and then the mixture is dried and pulverized. When said liquid or powder is blended in an amount of about 0.01—about 10% by weight based on dry detergent, a marked improvement in appearance of the detergent is observed.

The liquid or powder obtained according to the above process (A) may not only be mixed directly with a detergent but may also be blended with a detergent solution or suspension containing a suitable builder such as Glauber's salt (sodium sulfate), phosphate, benzene type sulfonate, soda ash or CMC (carboxymethyl cellulose). Alternatively, said liquid or powder may be mixed with the builder after blending the same with a detergent. After the mixing, the mixture may be dried according to any of hot air drying, vacuum drying at normal temperature or spray drying. In the case of soaps composed mainly of higher fatty acids, they are homogeneously mixed with said liquid or powder and are then cooled and dried to obtain desired products.

The soaps referred to herein include Marseille soaps, and the synthetic detergents include alkylbenzenesulfonate type detergents such as sodium dodecylbenzenesulfonate; α-olefin type detergents such as sodium α-olefin sulfonate; and aliphatic alcohol type detergents such as sodium lauryl alcohol sulfate.

(C) Compositions

The β-form compounds are mixed according to the conventional mixing procedure with alkaline phosphates and/or alkaline silicates to obtain a solid composition, the amount ratio of the compound and the phosphates and/or silicates being 1:0.1 to 10.

In this process, if necessary, water is employed to form liquid compositions such as aqueous dispersion and aqueous suspension. The optical brightening compositions in solid state do not suffer from yellowing even when formed into aqueous dispersions, suspensions or solutions. Further, they are markedly stable as compared with the β-form compounds alone or with the β-form compositions incorporated with other salts. This indicates the fact that the above-mentioned salts act as markedly strong β→α transistion-preventing agents. The alkaline phosphates and alkaline silicates employed may be the same as mentioned in item (A).

The present invention will be illustrated below with reference to examples, but the scope of the invention is not limited to these examples, parts are by weight.

EXAMPLE 1

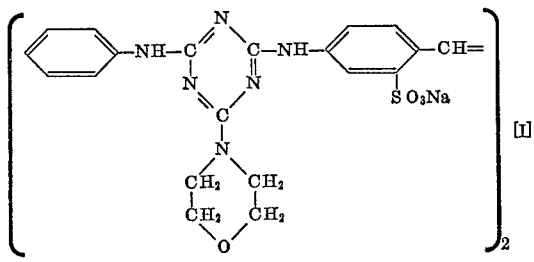

10 parts of β-form crystals of a compound represented by the above formula were added to 100 parts of a 10% aqueous sodium tripolyphosphate solution. To this mixture were added 200 parts of glass beads, and the resulting mixture was stirred at 70°–80° C. for 2 hours to finally pulverize said crystals. Thereafter, the mixture was passed through a 100 mesh wire net to remove the glass beads, and the resulting liquid was subjected to spray drying to obtain a pure white dye powder (β-form crystals having particle size of about 1 x 2μ). This dye powder (dye content: 0.6 part) was thoroughly kneaded with 10 parts of 1 N-caustic soda and was then charged with 150 parts of water. Subsequently, the mixture was stirred at 40° C. to form a dispersion. To this dispersion was added 200 parts of an international heavy duty detergent 60% (sodium dodecylbenzenesulfonate:sodium tripolyphosphate: Glauber's salt=1:1:1), and the mixture was kneaded at 40° C. for 5 minutes. Thereafter, the mixture was pre-dried at 90° C. for 2 hours and was then dried at 110° C. for 6 hours. The dried mixture was pulverized and was passed through a 35 mesh wire net to obtain a washing agent.

The thus obtained washing agent was markedly excellent, as shown below, in optical brightening efficiency at low temperatures and appearance of washing agent as compared with a washing agent prepared in the same manner as above except that a dye powder obtained through "Jet Mizer" pulverization was used.

| Pulverization process | Optical brightening efficiency on cotton | | Appearance of washing agents |
| --- | --- | --- | --- |
| | 10° C. x 10 min. | 25° C. x 10 min. | |
| "Jet Mizer" | Standard | Standard | Standard. |
| Present process | Very markedly excellent. | Markedly excellent. | Fairly excellent. |

EXAMPLE 2

10 parts of β-form crystals of the dye (potassium salt) employed in Example 1 were added to 100 parts of a 5% aqueous potassium tripolyphosphate solution. To this mixture were added 3 parts of potassium carbonate and 200 parts of glass beads, and the resulting mixture was stirred at room temperatures for 2 hours to finely pulverize crystals. Thereafter, the mixture was treated in the same manner as in Example 1, to obtain a white dye powder (β-form crystals having particle size of about 1 x 2μ).

The washing agent prepared by incorporation of said dye powder showed markedly excellent properties like in the case of the product obtained in Example 1.

EXAMPLE 3

20 parts of β-form crystals of the dye employed in Example 1 were added to 100 parts of a 10% aqueous sodium orthophosphate solution. To this mixture were added 2 parts of i-butanol and 250 parts of glass beads, and the resulting mixture was stirred at 70°–80° C. for 4 hours to finely pulverize crystals. Thereafter, the mixture was treated in the same manner as in Example 1, to obtain a pure white dye powder (β-form crystals having particle size of about 1 x 2μ).

The washing agent prepared by incorporation of said dye powder showed markedly excellent properties like in the case of the product obtained in Example 1.

EXAMPLE 4

Example 3 was repeated, except that a nonionic surface active agent, e.g. sulfonated naphthalene-formaldehyde condensation product was used in place of i-butanol, whereby the same results as in Example 3 were obtained.

EXAMPLE 5

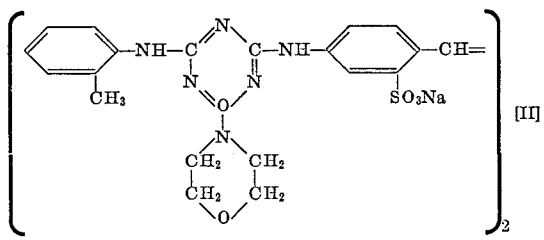

β-Form crystals of a compound represented by the above formula were treated in the same manner as in Example 2, except that sodium pyrophosphate was used in place of the potassium tripolyphosphate, whereby a dye powder excellent in properties like in the case of the product of Example 1 was obtained.

EXAMPLE 6

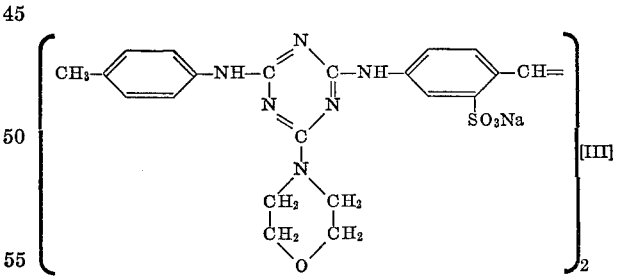

β-Form crystals of a compound represented by the above formula were treated in the same manner as in Example 2, except that sodium primary phosphate was used in place of the potassium tripolyphosphate, whereby a dye powder excellent in properties like in the case of the product of Example 1 was obtained.

EXAMPLE 7

The liquids of Examples 1 and 5 were directly blended with detergents without adopting the drying step, whereby washing agents markedly excellent in properties like in the case of the products of Examples 1 and 5 were obtained.

EXAMPLE 8

The liquid composition of Example 1 was subjected to a ball mill at room temperature and was then spray-dried, whereby a dye powder excellent in properties like in the case of the product of Example 1 was obtained.

EXAMPLE 9

To a mixture comprising 10 parts of β-form crystals of the compound represented by the Formula I and 100 parts of i-butanol were added 200 parts of glass beads, and the mixture was stirred at room temperature for 2 hours to finely pulverize crystals. Subsequently, the mixture was passed through a 100 mesh wire net to remove the glass beads, whereby a liquid (β-form crystals having particle size of about 1 x 2μ) was obtained. The washing agent prepared by incorporation of the thus obtained dye liquid displayed markedly excellent efficiencies like in the case of the product obtained in Example 1.

EXAMPLE 10

To a mixture comprising 20 parts of β-form crystals of the dye employed in Example 9 and 100 parts of methyl acetate were added 250 parts of glass beads, and the mixture was stirred at room temperature for 4 hours to finely pulverize crystals. Subsequently, the glass beads were removed by the same manner as in Example 9 to obtain a liquid containing β-form crystals having particle size of about 1 x 2μ.

The washing agent prepared by incorporation of the thus obtained dye liquid displayed markedly excellent efficiencies like in the case of the product obtained in Example 1.

EXAMPLE 11

Example 10 was repeated, except that ethyl benzoate was used in place of methyl acetate, to obtain the same result as in Example 10.

EXAMPLE 12

To a mixture comprising 10 parts of β-form crystals of the dye (potassium salt) employed in Example 9 and 100 parts of acetone were added 200 parts of glass beads, and the mixture was stirred at room temperature for 2 hours to finely pulverize crystals. Subsequently, the acetone was removed under reduced pressure to obtain a white dye powder (β-form crystals having particle size of about 1 x 2μ).

The washing agent prepared by incorporation of the thus obtained dye powder displayed markedly excellent efficiencies like in the case of the product obtained in Example 9.

EXAMPLE 13

Example 12 was repeated, except that acetophenone was used in place of acetone and filtration was effected in place of the reduced pressure distillation, to obtain the same result as in Example 12.

EXAMPLE 14

β-Form crystals of the compound represented by the Formula II were treated in the same manner as in Example 9, except that n-hexane was used in place of i-butanol, to obtain a liquid having excellent efficiencies like in the case of the product of Example 9.

EXAMPLE 15

β-Form crystals of the compound represented by the Formula III were treated in the same manner as in Example 9, except that trichloroethylene was used in place of i-butanol. Thereafter, the trichloroethylene was removed under reduced pressure to obtain a pale yellowish white dye powder.

The washing agent prepared by incorporation of the thus obtained dye powder displayed excellent efficiencies like in the case of the product obtained in Example 9.

EXAMPLE 16

β-Form crystals of the compound employed in Example 14 were treated in the same manner as in Example 9, except that benzene was used in place of i-butanol. Thereafter, benzene was removed under reduced pressure to obtain a white dye powder.

The washing agent prepared by incorporation of the thus obtained dye powder displayed excellent efficiencies like in the case of the product obtained in Example 9.

EXAMPLE 17

Example 16 was repeated, except that monochlorobenzene was used in place of benzene and filtration was effected in place of the reduced pressure distillation, to obtain the same result as in Example 16.

EXAMPLE 18

β-Form crystals of the dye (potassium salt) employed in Example 9 were treated in the same manner as in Example 9, except that a mixed solvent comprising methanol and benzene in a volume ratio of 1:1 was used in place of i-butanol. Thereafter, the solvent was removed by normal pressure distillation to obtain a white dye powder (β-form crystals having particle size of about 1 x 2μ).

The washing agent prepared by incorporation of the thus obtained dye powder displayed markedly excellent efficiencies like in the case of the product obtained in Example 9.

EXAMPLE 19

The liquid composition of Example 9 was subjected to the ball mill pulverizing process at room temperature and was then centrifuged to separate solids. The separated solids were directly added to a detergent, whereby the washing agent displayed excellent efficiencies like in the case of the product obtained in Example 9.

EXAMPLE 20

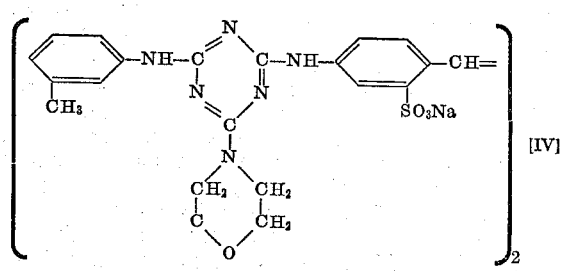

Example 9 was repeated, except that β-form crystals of a compound represented by the above formula was used, whereby a liquid (containing β-form particles having a size of about 1 x 2μ) was obtained.

EXAMPLE 21

The dye powder (dye content: 0.6 part) obtained in Example 1 was thoroughly kneaded with 10 parts of 1 N-caustic soda and was then charged with 150 parts of water. Subsequently, the mixture was stirred at 40° C. to form a dispersion. To this dispersion was added 200 parts of an international heavy duty detergent (60% sodium dodecylbenzenesulfonate: sodium tripolyphosphate: Glauber's salt=1:1:1), and the mixture was kneaded at 40° C. for 5 minutes. Thereafter, the mixture was pre-died at 90° C. for 2 hours and was then dried at 110° C. for 6 hours. The dried mixture was pulverized and was passed through a 35 mesh wire net to obtain a washing agent.

EXAMPLE 22

The powder (dye content: 0.5 part) obtained in Example 5 was dispersed in 5 parts of hot water and was added to an aqueous suspension comprising 30 parts of water and 100 parts of sodium α-olefin sulfonate having 15-18 carbon atoms. Subsequently, the dispersion was homogeneously stirred and was then spray-dried to obtain a washing agent.

EXAMPLE 23

The liquid obtained in Example 20 was treated in the same manner as in Example 21, whereby the washing agent was obtained.

EXAMPLE 24

The powder obtained in Example 15 was treated in the same manner as in Example 22, whereby a washing agent was obtained.

EXAMPLE 25

10 parts of β-form crystals of the compound represented by the Formula I were mixed with 5 parts of sodium tripolyphosphate to prepare a composition. This composition did not become yellow at all even when formed into a stock solution by dilution with 50 parts of water.

EXAMPLE 26

To a mixture comprising 10 parts of β-form crystals of a compound represented by the Formula II and 2 parts of sodium tripolyphosphate was added 100 parts of water to prepare a water-dispersed composition. This composition was stable as compared with compositions incorporated or not incorporated with other salts and showed no yellowing at all.

EXAMPLE 27

Compositions were prepared according to the prescriptions set forth in the following table:

All of the above-mentioned compositions were extremely stable, and stock solutions formed therefrom showed no yellowing even when allowed to stand for a month.

What we claim is:

1. A detergent composition containing:
   (A) an effective amount of a detergent surfactant selected from the group consisting of Marseille soap, alkylbenzenesulfonates, -olefin sulfonates and aliphatic alcohol sulfonates;
   (B) an effective amount of a detergent material selected from the group consisting of sodium sulfate, soda ash, sodium or potassium phosphate, sodium or potassium tripolyphosphate, sodium or potassium benzene sulfonate, sodium or potassium toluene sulfonate, sodium or potassium xylene sulfonate and carboxymethyl cellulose; and
   (C) an effective optical brightening amount of a compound represented by the formula,

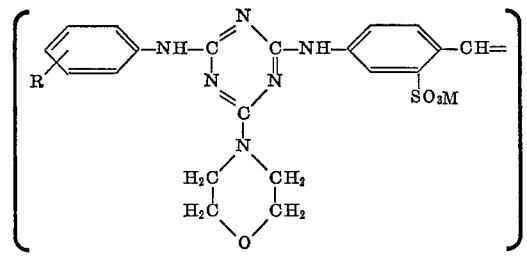

| β-Form compound | Part of the compound | Alkaline phosphate | Part of the phosphate | Property | Part of water |
|---|---|---|---|---|---|
| Compound: | | | | | |
| I | 10 | Potassium tripolyphosphate. | 2 | Liquid | 100 |
| I | 10 | Sodium orthophosphate. | 3 | Solid | 0 |
| I | 10 | Sodium metaphosphate. | 2 | ...do | 0 |
| II | 10 | Sodium pyrophosphate. | 1 | Liquid | 100 |
| IV | 10 | {Sodium primary phosphate. Caustic soda | 2  3} | Solid | 0 |
| III | 10 | {Potassium secondary phosphate. Soda ash | 1  2} | ...do | 0 |

All of the above-mentioned compositions were extremely stable, and stock solutions formed therefrom showed no yellowing even when allowed to stand for a month.

EXAMPLE 28

10 parts of β-form crystals of the same compound as in Example 25 were mixed with 5 parts of sodium silicate to prepare a composition. This composition showed no yellowing at all even when formed into a stock solution by dilution with 50 parts of water.

EXAMPLE 29

Compositions were prepared according to the prescriptions set forth in the following table:

present as β-form crystals which have been pulverized to a particle size of about 1 x 2μ in the presence of:
   (A) a mixture of alkaline phosphates and water, a mixture of alkaline silicates and water or a mixture of alkaline phosphates, alkaline silicates and water, the amount of the compound being 0.1–0.5 times the weight of the mixture, and the amount of the alkaline phosphates, the alkaline silicates or the mixture thereof being 0.05–0.5 times the weight of the water; or
   (B) in the presence of at least one solvent selected from the group consisting of alcohols, esters, ketones halogenated hydrocarbons and hydrocarbons, the amount of the compound being 0.1–0.5 times the weight of the solvent.

| β-Form compound | Part of the compound | Alkaline silicate | Part of the silicate | Property | Part of water |
|---|---|---|---|---|---|
| Compound: | | | | | |
| I | 10 | {Silicic acid Soda ash | 2  3} | Liquid | 100 |
| II | 10 | {Silicon monoxide Caustic soda | 1  2} | ...do | 100 |
| IV | 10 | Sodium metasilicate | 5 | Solid | 0 |
| III | 10 | Potassium tetrasilicate | 5 | ...do | 0 |

2. A detergent composition in accordance with claim 1 which contains sodium dodecylbenzenesulfonate, sodium tripolyphosphate and sodium sulfate in the relative proportions of 1:1:1.

References Cited

UNITED STATES PATENTS

| | | | |
|---|---|---|---|
| 2,612,501 | 9/1952 | Wilson | 252—301.2 W X |
| 3,132,106 | 5/1964 | Villaume | 252—301.2 W |
| 3,392,122 | 7/1968 | Obayashi et al. | 252—524 X |
| 3,546,218 | 12/1970 | Tscharner | 252—110 X |
| 3,558,611 | 1/1971 | Fleck | 252—110 X |
| 3,630,944 | 12/1971 | Ohkawa et al. | 252—301.2 X |
| 3,632,491 | 1/1972 | Zussman et al. | 252—524 |

FOREIGN PATENTS 680,847  11/1966  Belgium.

LEON D. ROSDOL, Primary Examiner

D. L. ALBRECHT, Assistant Examiner

U.S. Cl. X.R.

252—524, 543